(12) United States Patent
Czapka et al.

(10) Patent No.: US 11,013,167 B2
(45) Date of Patent: May 25, 2021

(54) BULK PRODUCT TANK FOR AN AGRICULTURAL IMPLEMENT

(71) Applicant: CNH INDUSTRIAL AMERICA LLC, New Holland, PA (US)

(72) Inventors: Jason Czapka, Burr Ridge, IL (US); Brian John Anderson, Yorkville, IL (US)

(73) Assignee: CNH Industrial America LLC, New Holland, PA (US)

( * ) Notice: Subject to any disclaimer, the term of this patent is extended or adjusted under 35 U.S.C. 154(b) by 482 days.

(21) Appl. No.: 15/842,875

(22) Filed: Dec. 14, 2017

(65) Prior Publication Data

US 2019/0183037 A1  Jun. 20, 2019

(51) Int. Cl.
| | | |
|---|---|---|
| B65D 43/26 | (2006.01) | |
| A01C 15/00 | (2006.01) | |
| B65D 43/16 | (2006.01) | |
| A01C 7/20 | (2006.01) | |

(52) U.S. Cl.
CPC .......... *A01C 15/006* (2013.01); *B65D 43/161* (2013.01); *B65D 43/26* (2013.01); *A01C 7/20* (2013.01)

(58) Field of Classification Search
CPC ......... A01C 15/006; A01C 15/00; A01C 7/06; A01C 7/20; B65D 43/00; B65D 43/14; B65D 43/16; B65D 43/161; B65D 43/26
See application file for complete search history.

(56) References Cited

U.S. PATENT DOCUMENTS

| | | | | |
|---|---|---|---|---|
| 4,541,549 A | * | 9/1985 | Hadley | A01C 15/006 111/34 |
| 4,896,746 A | * | 1/1990 | Desjardins | F01M 11/04 123/196 R |
| 5,125,576 A | * | 6/1992 | Ziegenbein | A01M 7/0085 239/113 |
| 5,161,473 A | | 11/1992 | Landphair et al. | |
| 6,189,959 B1 | * | 2/2001 | VanAssche et al. | B60R 27/00 296/207 |
| 6,581,530 B1 | * | 6/2003 | Hall | A01B 73/02 111/200 |
| 6,668,738 B2 | | 12/2003 | Lee et al. | |
| 6,902,082 B2 | * | 6/2005 | Mabry | B01D 3/10 105/377.07 |
| 7,182,109 B2 | * | 2/2007 | Kolberg | B60K 15/04 137/592 |
| 7,658,570 B2 | * | 2/2010 | Hill | E02D 29/1418 220/232 |
| 7,703,404 B2 | * | 4/2010 | Horn | A01C 15/006 111/174 |

(Continued)

*Primary Examiner* — Nicolas A Arnett
(74) *Attorney, Agent, or Firm* — Rebecca L. Henkel; Rickard K. DeMille

(57) ABSTRACT

In one embodiment, an agricultural implement system includes a product tank configured to carry a product during farming operations. The product tank includes a quick fill port system. The quick fill port system includes a first wall defining a first opening leading to an inside of the product tank. The quick fill port system further includes a first cover member disposed on the first opening and configured to at least partially cover and to uncover the first opening, wherein the first opening comprises a first size larger than a diameter of a product dispenser configured to be inserted into the first opening.

15 Claims, 8 Drawing Sheets

(56) References Cited

U.S. PATENT DOCUMENTS

| | | | |
|---|---|---|---|
| 7,883,137 B2* | 2/2011 | Bar | B60K 15/0406 |
| | | | 141/312 |
| 8,387,824 B2 | 3/2013 | Wietgrefe | |
| 8,714,344 B2 | 5/2014 | Kowalchuk et al. | |
| 8,733,257 B2 | 5/2014 | Beaujot et al. | |
| 8,770,120 B2 | 7/2014 | Naylor | |
| 10,104,833 B2* | 10/2018 | Beaujot | B65G 41/002 |
| 10,322,658 B2* | 6/2019 | Borkgren | B60P 1/00 |
| 2008/0009962 A1 | 1/2008 | Hood et al. | |
| 2009/0107580 A1* | 4/2009 | Enge | B60K 15/035 |
| | | | 141/95 |
| 2012/0325812 A1* | 12/2012 | Guinart Pallares | B65D 90/08 |
| | | | 220/212 |
| 2014/0190375 A1 | 7/2014 | Long | |

* cited by examiner

BULK PRODUCT TANK FOR AN AGRICULTURAL IMPLEMENT

BACKGROUND

The invention relates generally to agricultural implements. Specifically, the embodiments disclosed herein generally relate to bulk product tanks for agricultural implements.

Many types of agricultural implements are used for a variety of tasks, such as cultivating, tilling, planting, and harvesting. For example, seeders and planters are agricultural implements that include devices that create a trench in soil, deposit seeds into the trench, and fill the trench. A seeding/planting agricultural implement may include a bulk seed and/or dry fertilizer tank(s) coupled to a tow bar and wing assemblies coupled to either side of the tow bar. The wing assemblies typically include tool bars that extend perpendicular from the tow bar, row units that perform the farming operation are mounted on the tool bars, and supporting wheel assemblies that are disposed along the length of the tool bars. The bulk seed and/or dry fertilizer tank(s) may be used to transport seed for future crops, dry fertilizer, innoculants, biologicals, and so on. It would be beneficial to improve bulk product tanks for more efficient farming operations.

BRIEF DESCRIPTION

In one embodiment, an agricultural implement system includes a product tank configured to carry a product during farming operations. The product tank includes a quick fill port system. The quick fill port system includes a first wall defining a first opening leading to an inside of the product tank. The quick fill port system further includes a first cover member disposed on the first opening and configured to at least partially cover and to uncover the first opening, wherein the first opening comprises a first size larger than a diameter of a product dispenser configured to be inserted into the first opening.

In another embodiment, a bulk fill product tank system includes a quick fill port system The quick fill port system includes a first wall defining a first opening leading to an inside of the product tank. The quick fill port system further includes a first cover member disposed on the first opening and configured to at least partially cover and to uncover the first opening; wherein the opening comprises a first size larger than a diameter of a product dispenser configured to be inserted into the first opening.

In a further embodiment, an agricultural implement kit includes a quick fill port system. The quick fill port system includes a first wall defining a first opening leading to an inside of the product tank. The quick fill port system further includes a first cover member disposed on the first opening and configured to at least partially cover and to uncover the first opening; wherein the opening comprises a first size larger than a diameter of a product dispenser configured to be inserted into the first opening. The kit further includes instructions for installing the quick fill port system into an agricultural product tank.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Agricultural implements, for example, planters, may include a bulk fill product tank or tanks for carrying seed and for distributing seed during farming operations. For example, the bulk fill product tanks may be first filled with seed and then the seed may be planted via planter equipment. For example, the planter equipment may transfer seed from the bulk fill product tanks and deposit the seeds in the ground at a desired depth and row spacing.

The techniques described herein provide for improved structural features in a bulk fill product tank, such as a "Quick Fill" Port (QF) port system. For example, the QF port system would allow a single seed or product tender machine operator to insert an appropriately sized "snout" or funnel extension of a seed tender machine into the QF port system on the bulk fill product tank and fill the bulk fill product tank from ground level. When the seed tender funnel is removed from the QF port system of the bulk fill product tank, the QF port system would automatically resume a sealed/closed state, thus enabling a more efficient and timely operation. It is to be understood that the techniques described herein, such as the QF port system, may be applicable to other agricultural equipment that include dry product tanks, such as dry fertilizer applicators, micronutrient applicators, inoculants, air cart, biologicals, and the like.

Figure 1:
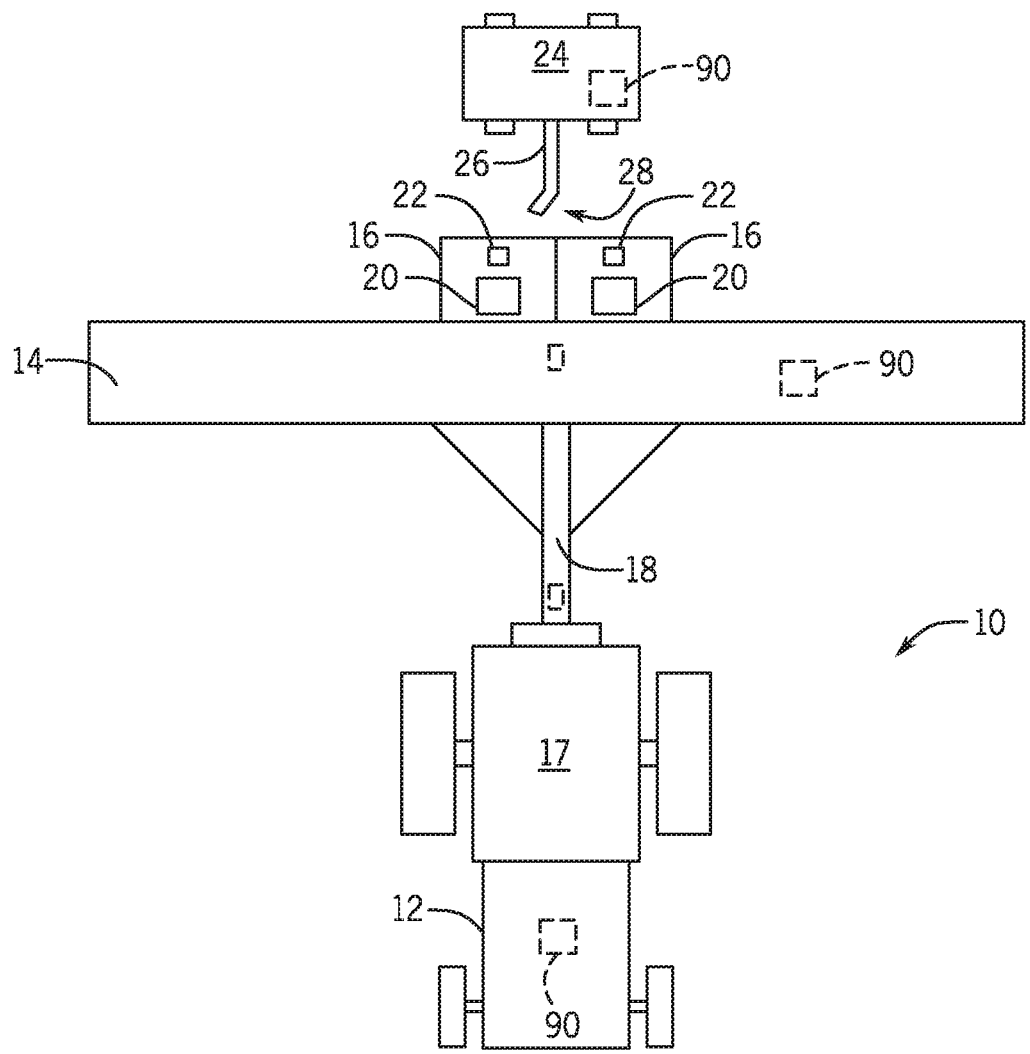
FIG. 1 is a top block view of an agricultural implement that may include a bulk fill product tank(s) suitable for transporting seed during farming operations and a quick fill (QF) port system disposed in the bulk fill product tank(s), in accordance with an embodiment of the present approach.

For illustrations purposes describing an agricultural implement that may include a bulk fill product tank with a QF port system, FIG. 1 is a top block view of an embodiment of an agricultural system 10. The agricultural system 10 includes an agricultural vehicle 12 and an agricultural implement 14 and two bulk fill product tanks 16. In some embodiments, the agricultural implement 14 and bulk fill product tanks 16 may be towed behind the agricultural vehicle 12 (e.g., as shown in FIG. 1). The agricultural vehicle 12 may be any vehicle suitable for towing the agricultural implement 14, such as a tractor, off-road vehicle, work vehicle, or the like. The agricultural vehicle 12 may include a cab 17, in which an operator sits during operation of the agricultural vehicle 12. The cab 17 may be an open or closed cab. Additionally, the agricultural implement 14 may be any suitable implement, such as a ground-engaging implement (e.g., a soil conditioner, a tillage implement, a fertilizer application implement, a planter, a seeder, or a combination thereof) or a sprayer/applicator, suitable for agricultural use. The agricultural implement 14 may be coupled to the agricultural vehicle 12 via a hitch system 18. The hitch system 18 may rigidly couples the agricultural implement 14 to the vehicle 12, such that the implement 14 can move upward and downward. It should be understood, however that other systems for coupling the implement 14 to the vehicle 12 may be possible.

As depicted, each of the bulk fill product tanks 16 includes a bulk fill tank opening 20 having a cover and a "Quick Fill" port system 22. While traditional bulk fill product tanks 16 typically include the covered opening 20 for deposition of seed, the techniques described herein include the QF port system 22, which may be used alternative to or in lieu of the covered opening 20. In operations, certain product, such as seeds, fertilizer, micronutrients, and the like, may be carried by a product delivery vehicle 24, such as a seed tender system 24, for delivery of the product into the bulk fill product tanks 16.

The seed tender system 24 may include a deposition system 26 which may have a "snout" or funnel extension 28 at a distal end of the deposition system 26. In use, the seed tender system 24 may be driven or towed to the agricultural system 10, and then the deposition system 26 may be deployed to position the funnel extension 28 either onto the opening 20 or into the QF port system 22. A seed tender operator may then fill the bulk fill product tanks 16 from ground level. The QF port system 22 may include certain features that may aid the operator while filling the bulk fill product tanks 16, as further described below. It is to be noted that the QF port system 22 may be provided as a retrofit kit with installations instructions and/or supplies. That is, the QF port system 22 may be installed, for example, in the field, to retrofit existing equipment that may not have the QF port system 22 when the equipment (e.g., bulk fill product tanks 16) were first delivered. A control system 90 is also depicted, which may be disposed in one or more of the vehicle 10, agricultural implement 14, and/or product delivery vehicle 24 and communicatively/operatively coupled to the QF port system 22, as described in more detail below.

Figure 2:
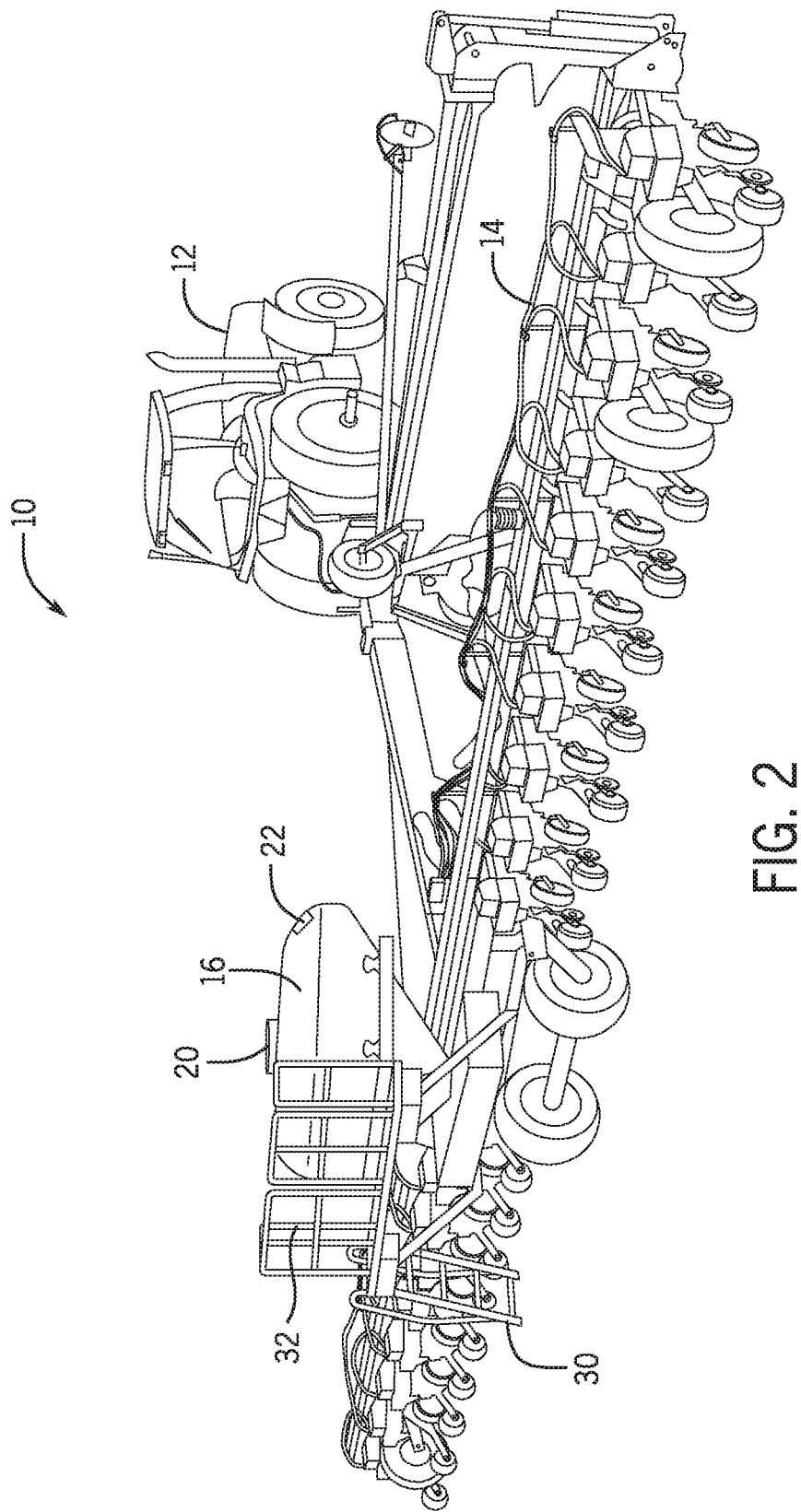
FIG. 2 is a perspective view illustrating an embodiment of the agricultural implement of FIG. 1 having embodiments of the bulk fill product tank with the QF port system.

It may be beneficial to show a perspective view of and embodiment of the bulk fill product tank 16 disposed for operations. Turning now to FIG. 2, is a perspective view illustrating an embodiment of the bulk fill product tank 16 and the agricultural implement 14 disposed for operations while being towed by the agricultural vehicle 12. Because the figure includes like elements from the figure above, the like elements include like element numbers. In the depicted embodiment, the agricultural implement 14 and the bulk fill product tank 16 are shown in an operating position for transport via the agricultural vehicle 12 during planting operations. Also shown are a ladder 30 connected to a platform 32 that may be used to inspect and/or aid in filling or servicing (e.g., unplugging jams and so on) the bulk fill product tank 16. However, the techniques described herein may enable a single operator, such as the seed tender system 24 operator, to fill the bulk fill product tank 16 from ground level, thus improving efficiency and reducing operations time.

Figure 3:
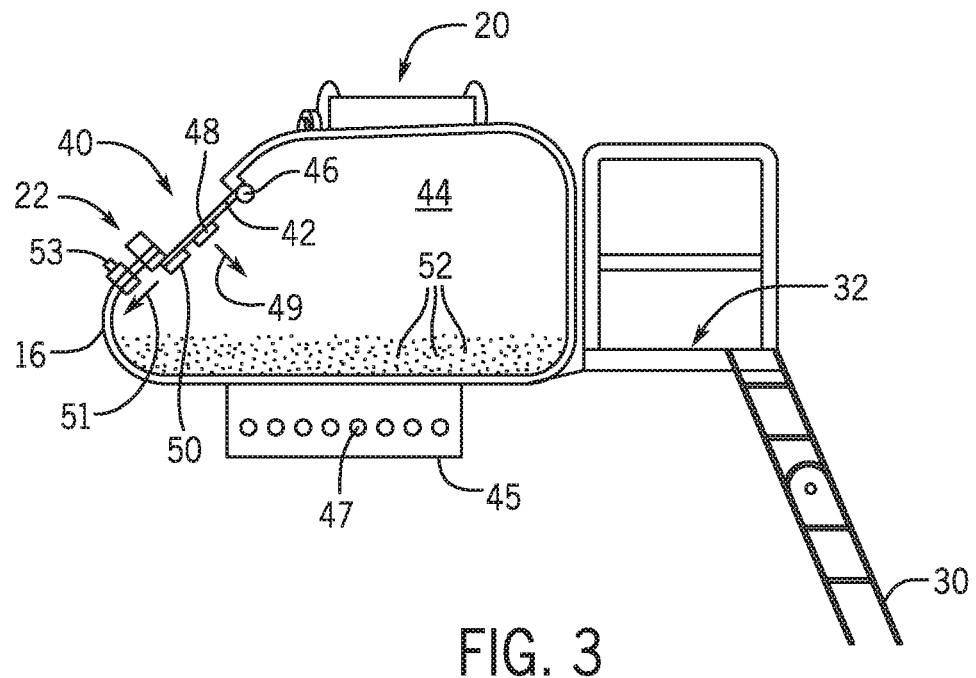
FIG. 3 is a sectional side view of an embodiment of the bulk fill product tank of FIGS. 1 and 2 having the QF port system with a closed lid, in accordance with an embodiment of the present approach.

Turning now to FIG. 3, the figure is a sectional side view of an embodiment of the bulk fill product tank 16 having the QF port system 22. Because the figure utilizes like elements as those found in the figures above, the like elements are illustrated using like element numbers. As shown, the figure illustrates an opening 40 with a lid (e.g., cover member) 42 of the QF port system 22 disposed on a bottom portion of the opening 40 and used to provide access through the opening 40 to an inside portion 44 of the bulk fill product tank 16. The figure also shows the bulk fill product tank 16 disposed over an inductor box 45 having an inductor 47 to fluidize product from the bulk fill product tank 16 into, for example, an air/product mixture. As the bulk fill product tank 16 is filled, pressure build-up inside the bulk fill product tank 16 may be relieved, for example, via an automatic relief valve 53. The automatic relief valve 53 may open after certain pressure measurements (e.g., over 1 bar) to enable air to vent to the atmosphere or open automatically when the system 22 opens or via the tender system 24.

The lid 42 may be attached to the bulk fill product tank 16 via a spring-loaded hinge 46. The spring-loaded hinge 46 may provide a normally closed (NC) bias to the lid 42, thus maintaining the lid 42 in a closed position, as depicted, until opened, for example, by abutting the "snout" or funnel extension 28 of the seed tender system 24 against the lid 42, as further described below with respect to FIG. 4. Also shown are sensor systems 48 and 50. More specifically, the sensor systems 48 and 50 may include cameras, ultrasonic sensors, radar sensors, and the like, that may be used to measure levels of product or seed 52 in the bulk fill product tank 16. Sensor system 48 may have a field of view (FOV) in a direction 49, while sensor system 50 may have a FOV in a direction 51. The sensors 48 and/or 50 may additionally be mounted to the lid 42 and/or the bulk fill tank 16. The sensor systems 48 and 51 may additionally have FOV in directions 49 and 51 simultaneously, such as via 180° (or more) cameras. The sensor systems 48 and 50 may be communicatively coupled to a variety of devices, such as mobile devices (e.g., cell phones, tablets, laptops, notebooks, and so on), industrial controllers, and the like. Indeed, the sensor systems 48 and 50 may include wireless and/or wired communication capabilities (e.g., WiFi, mesh networks, Zigbee™, Bluetooth™, IEEE 802.X, Ethernet, RJ45, and the like). Accordingly, the QF port system 22 may communicate with the agricultural vehicle 12 operator, the seed tender system 24 operator, and/or other interested parties, and provide for measured levels of seed 52 or other product. A scale (e.g., ruler-style scale showing increments every few inches, centimeters, and so on) may be provided to aid in determining, for example via visual or other observations from the sensors 48, 50, when product has filled the bulk fill tank 16. Likewise, sensor systems 48 and/or 51 may be weight sensors disposed in the bottom of the bulk fill tank 16 to weigh the bulk fill tank 16 and thus provide weight feedback in addition to or alternative to visual feedback and the like.

Figure 4:
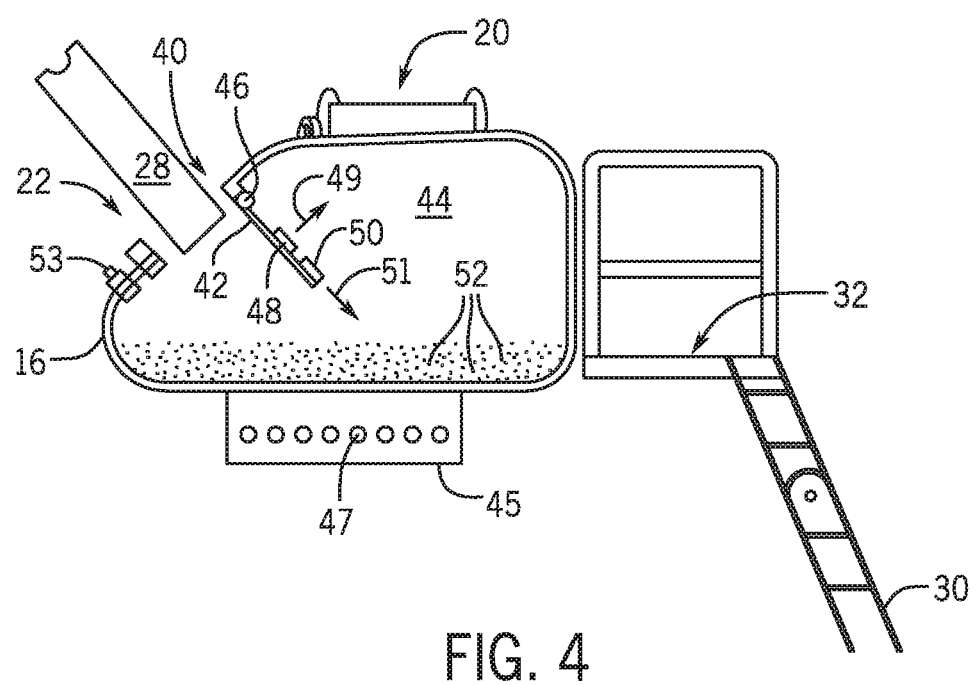
FIG. 4 is a sectional side view of an embodiment of the bulk fill product tank of FIGS. 1-3 having the QF port system with an opened lid, in accordance with an embodiment of the present approach.

In one embodiment, when the level of seed 52 is deemed to be low, the seed tender system 24 operator may insert the funnel extension 28 into the opening 40 abutting against the lid 42. The insertion force may push against the spring bias provided via the spring-loaded hinge 46, moving the lid 42 into an open position, as shown in the embodiment of FIG. 4. More specifically, FIG. 4 shows the funnel extension 28 inserted into the opening 40 with the lid 42 in the open position, enabling the filling of the bulk fill product tank 16 with product (e.g., seed 52). As the seed 52 fills the bulk fill product tank 16, the sensor 48 may observe the seed 52 level rise, until a desired level is reached. Indeed, the seed tender system 24 operator may stand at ground level and observe (e.g., via mobile device) as the desired seed 52 level is reached.

Once the desired seed 52 level is reached, the seed tender system 24 operator may then stop seed 52 flow and remove the funnel extension 28. The spring bias provided by the spring-loaded hinge 46 may then move the lid 40 back into the closed position shown in FIG. 3. It is to be understood that other techniques may be used to open and close the lid 40, and that the QF port system 22 may be retrofitted into an existing bulk fill product tank 16 as described in more detail below.

Figure 5:
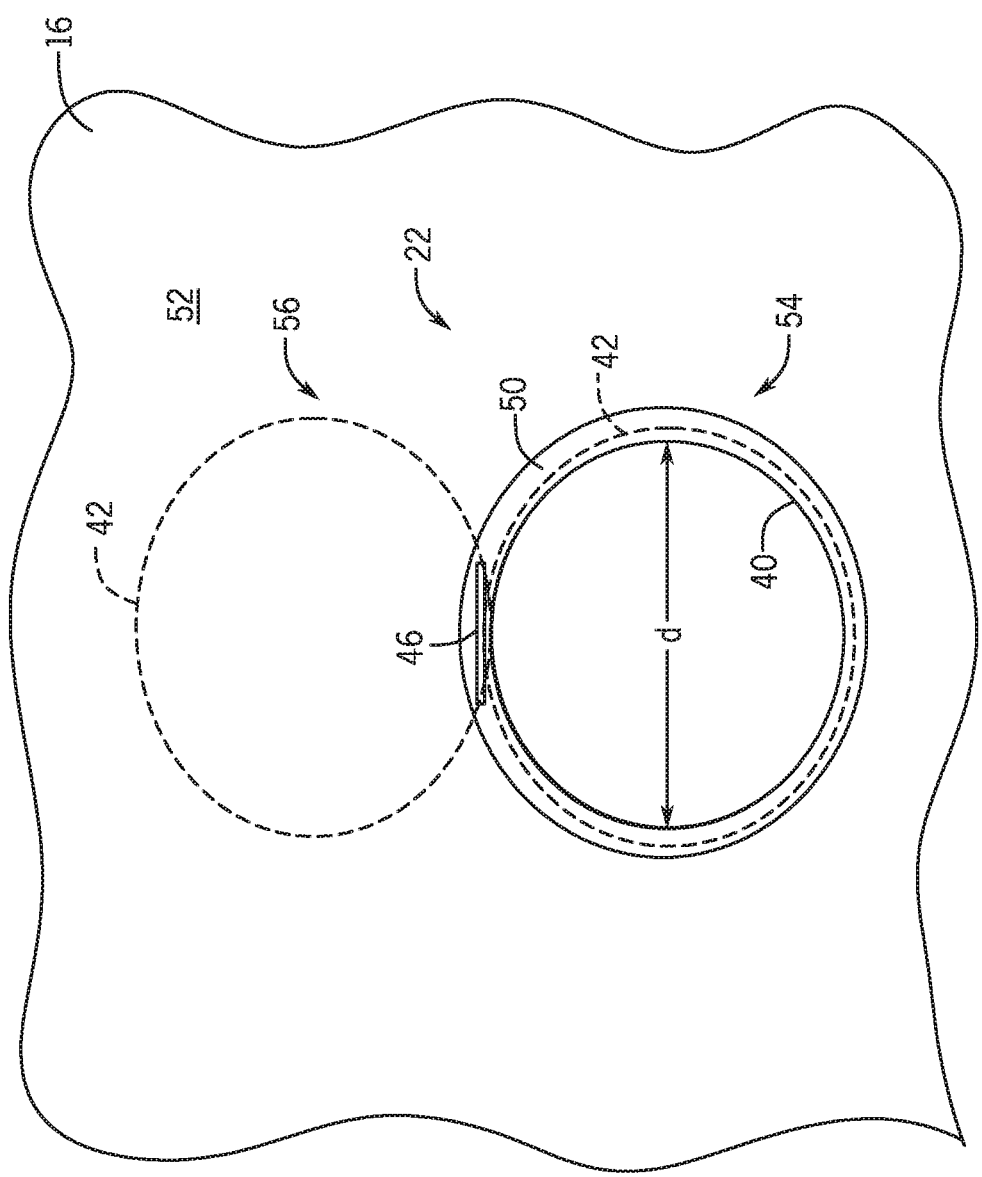
FIG. 5 is a is a top view illustrating an embodiment of the QF port system of FIGS. 1-4, in accordance with an embodiment of the present approach.

Turning now to FIG. 5, the figure is a top view illustrating an embodiment of the QF port system 22. As mentioned earlier, the QF port system 22 may be provided as a kit and then retrofitted into a bulk fill product tank 16. To do so, the opening 40 may first be created in the bulk fill product tank 16, for example via a powered saw and/or with other cutting instruments. The opening 40 may be created with a diameter d as shown larger than an outer diameter of the funnel extension 28. The QF port system 22 may then be inserted into the opening 40 until a lip or flange 50 abuts against a top surface 52 of the bulk fill product tank 16. The QF port system 22 may subsequently be fastened in place, for example via adhesives, screws, welds, nuts and bolts, and the like.

Indeed, by cutting or otherwise forming the opening 40, inserting the QF port system 22, and then fastening (e.g., gluing) the QF port system 22 in place, the QF port system 22 may be retrofitted into any number of containers or product tanks, such as the bulk fill product tank 16. Once retrofitted or manufactured into the bulk fill product tank 16, the QF port system 22 may provide for quick access and observations into the bulk fill product tank 16. As shown, the figure illustrates the lid 42 in a closed position 54 suitable for transport and operations, and then an open position 56 suitable for filling the bulk fill product tank 16 with product.

Figure 6:
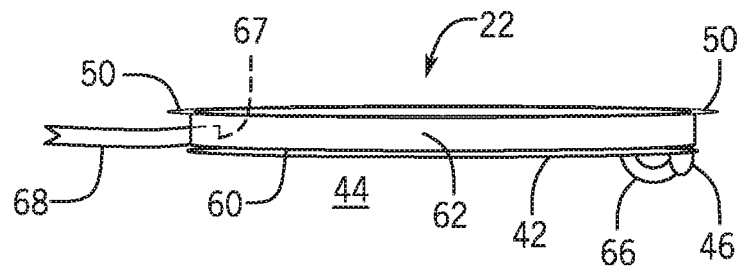
FIG. 6 is a side view illustrating an embodiment of the QF port system of FIGS. 1-5 with a lid disposed on a bottom portion, in accordance with an embodiment of the present approach.

In one embodiment, lid 42 may be disposed on a bottom section 60 of the QF port system 22, as shown in FIG. 6. More specifically, the figure is a perspective side view illustrating the lid 42 and the spring-loaded hinge 46 disposed under a sidewall (e.g., circular sidewall) 62 of the QF port system 22. In this embodiment, the lid 42 may open towards the inside 44 of the bulk fill product tank 16. The embodiment may further include a powered mechanism 66 (e.g., system than includes a stepper motor, a hydraulic arm, a pneumatic arm, a linear actuator, a non-linear actuator, a positioner, a solenoid, etc.) suitable for opening the lid 42 via an application of power (e.g., electric power, hydraulic power, pneumatic power). Embodiments that may collect moisture, e.g., water, may include drainage systems, such as one or more drainage ports 67. The drainage ports 67 may be fluidly coupled to one or more drainage conduits 68.

Figure 7:
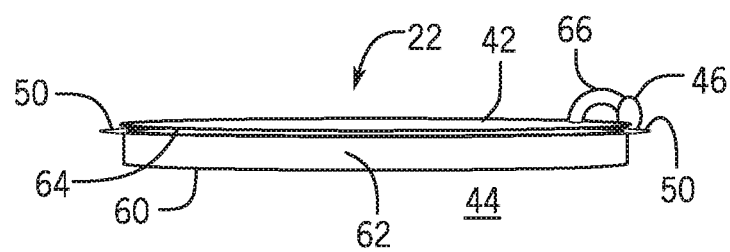
FIG. 7 is a side view illustrating an embodiment of the QF port system of FIGS. 1-6 with a lid disposed on a top portion, in accordance with an embodiment of the present approach.

In another embodiment, as shown in FIG. 7, the lid 42 may be disposed on a top section 64 of the QF port system 22. In this embodiment, the lid 42 may open away from the inside 44 of the bulk fill product tank 16, and may also include the powered mechanism 66. By providing for various bottom or top lid 42 resting positions, the techniques described herein may enable a more varied retrofit of the bulk fill product tank 16.

Figure 8:
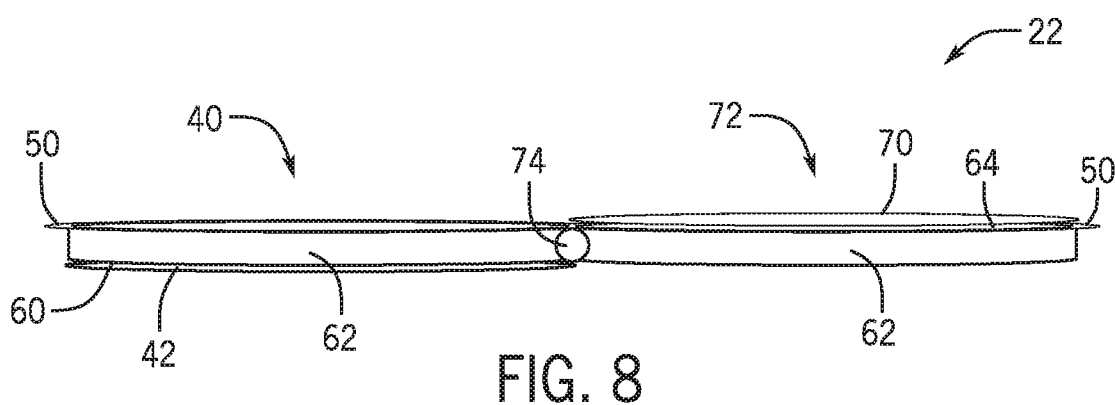
FIG. 8 is a side view depicting an embodiment of the QF port system of FIGS. 1-7 having two lids mechanically coupled to a hinge in a closed position, in accordance with an embodiment of the present approach.
Figure 9:
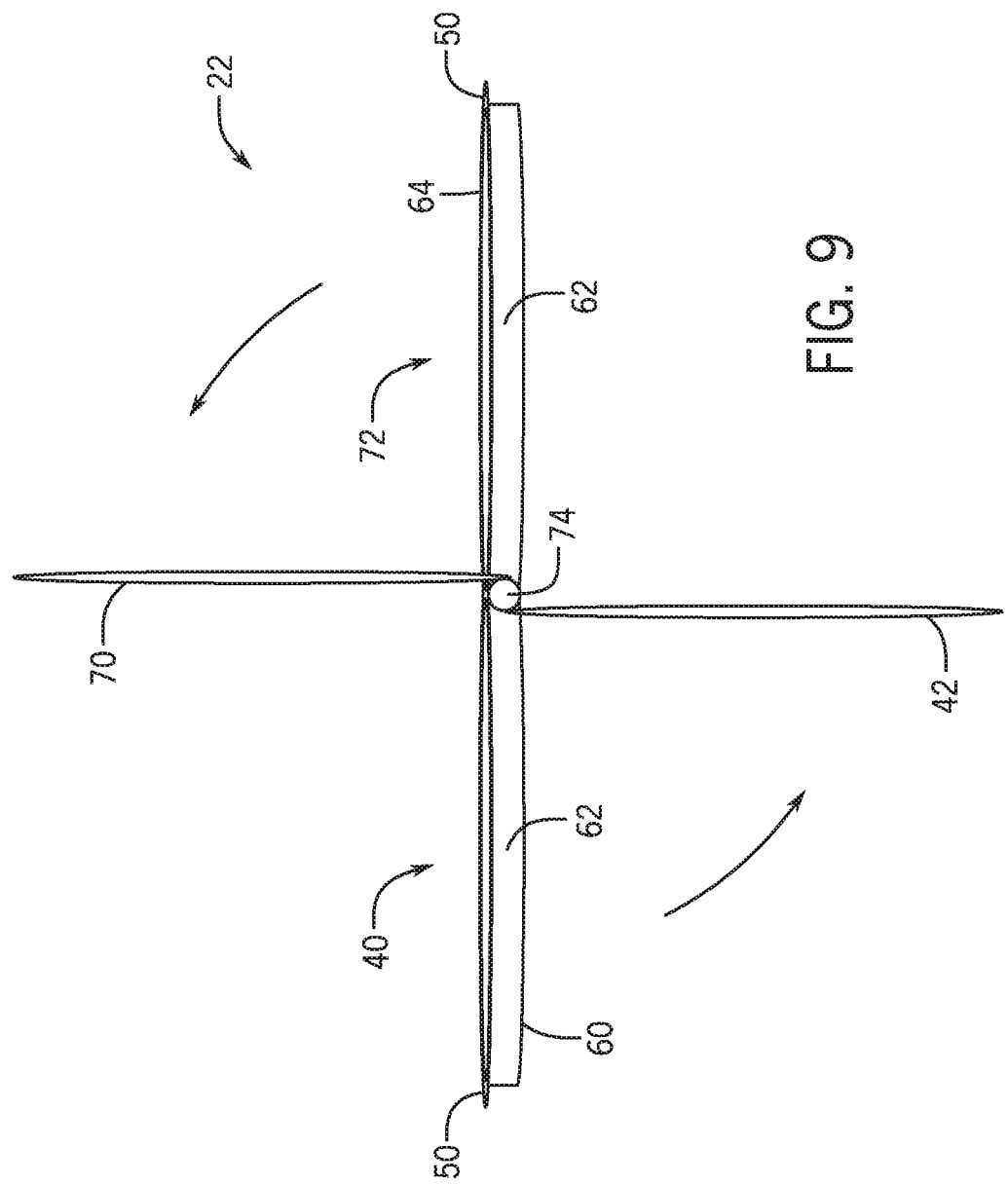
FIG. 9 is a side view depicting an embodiment of the QF port system of FIGS. 1-8 having two lids mechanically coupled to a hinge in an open position, in accordance with an embodiment of the present approach.

In certain embodiments, pressure relief may be provided (e.g., during filling) by opening a second lid, as shown in FIGS. 8 and 9. More specifically, FIG. 8 depicts an embodiment of the QF port system 22 having two lids 42, 70 suitable for protecting two openings 40, 72, respectively. In the depicted embodiment, the lids 42, 70 are mechanically connected via a spring-loaded hinge 74 disposed between sidewalls 62. The lid 42 is shown disposed on the bottom portion 60 while the lid 70 is disposed on the top portion 64 when closed. When the funnel extension 28 abuts against the lid 42, the lids 42 and 70 may rotate in unison about the spring-loaded hinge 74, as shown in the embodiment of FIG. 9. By mechanically coupling the lids 42, 70, so that they rotate in unison, the openings 40, 72 may be opened together. Accordingly, pressure increases in the bulk fill product tank 16 may be minimized or eliminated during filling of the bulk fill product tank 16. It is to be noted that while the openings 40, 72 are depicted as similar in size, in other embodiments, the opening 72 may be smaller or larger than the opening 40 to account for less or more pressure buildup elimination or reduction. It is to be understood that the lids 42 and 70 may be provided in different shapes, e.g., square, circular, oblong, rectangular, and so on. However, while not required, it is generally desired for the openings covered by the shapes to be of a size larger than a size the funnel extension 28 to enable the insertion of the funnel extension 28 into the bulk fill product tank 16.

Figure 10:
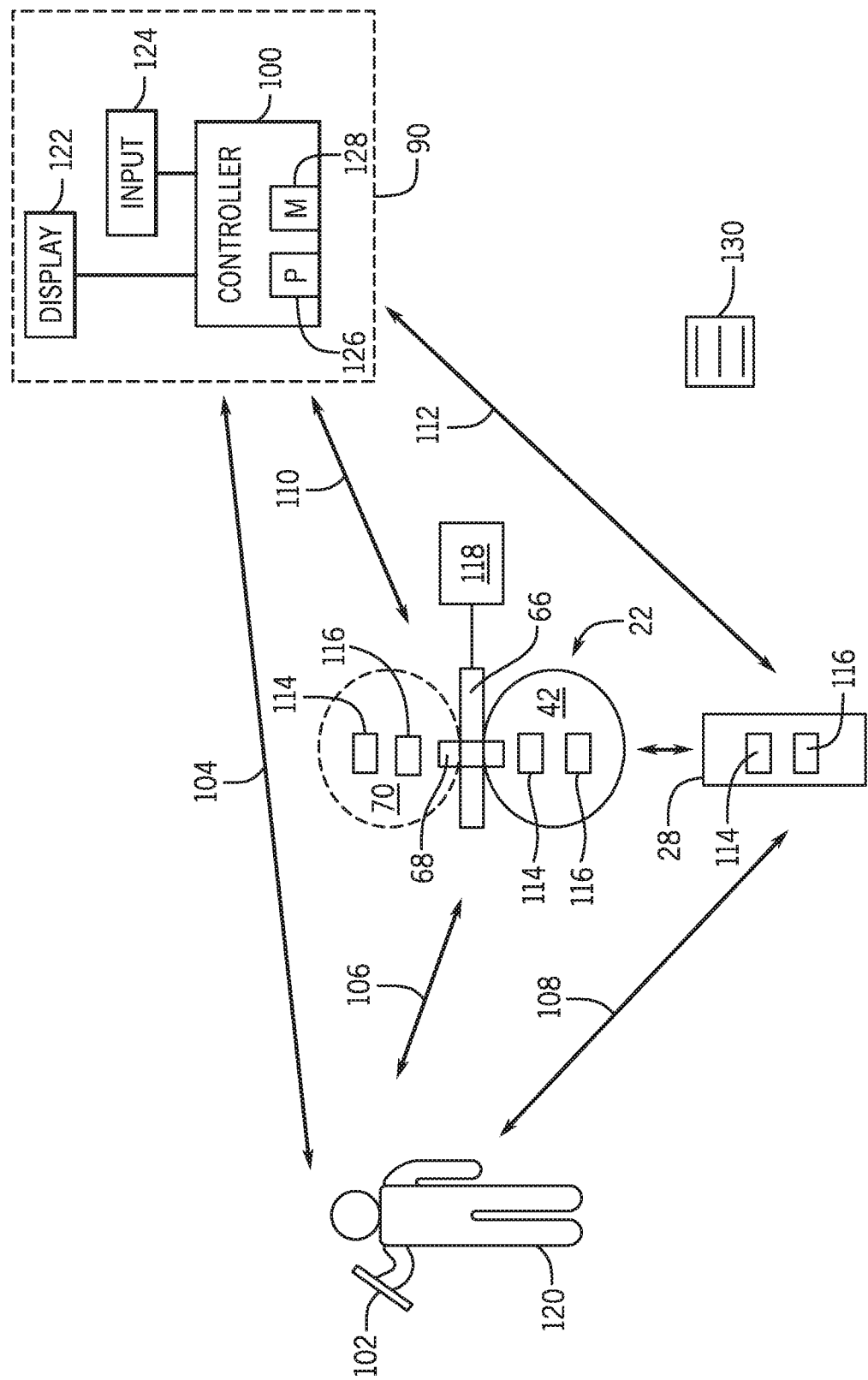
FIG. 10 is a block diagram of an embodiment of the QF port system of FIG. 1-9 communicatively coupled to a controller and/or a mobile device.

FIG. 10 is a block diagram illustrating an embodiment of the QF port system 22 communicatively coupled to a control system 90 and/or a mobile device 102. More specifically, the control system 90 (having controller 100) and/or the mobile device 102 may communicate via wired and/or wireless conduits 104, 106, 108, 110, 112 with each other and with various sensor systems and/or actuators. In the depicted embodiment, the sensors include sensor systems 114 and 116. As mentioned earlier, the sensor system 114 may be equivalent to the sensor systems 48 and 50 shown earlier and thus include one or more observation sensors such as cameras, ultrasonic sensors, radar sensors, bin-level proximity sensors, induction sensors, weight sensors, and the like. The sensor systems 116 may sense the presence of certain equipment or equipment proximity, such as the presence or proximity of the funnel extension 28. For example, the sensors 116 may include RFID tags/receivers, WiFi sensors, radar proximity sensors, and so on, suitable for detecting the presence of the funnel extension 28. Accordingly, as the funnel extension 28 approaches the QF port system 22 the lid 42 and/or 70 (in embodiments having the lid 70) may automatically open, for example, via the powered mechanism 66 without the funnel extension 28 having to make contact with the lid 42. In the depicted embodiment, power is supplied to the powered mechanism 66 via a power supply 118, such as an electric source, a hydraulic source, a pneumatic source, and so on.

In one embodiment, the funnel extension 28 may also include the sensor systems 114 and 116, as depicted. In this embodiment, the sensor systems 114, 116 disposed on the funnel extension 28 may be used to guide the funnel extension 28 as the funnel extension 28 is inserted into the bulk fill product tank 16 through the QF port 22. The sensor systems 114, 116 disposed in the funnel extension 28 may sense proximity to the bulk fill product tank 16 and/or the QF port 22 and notify an operator 120. The operator 120 may, for example, use the mobile device 102 to visualize the insertion of the funnel extension 28 through the QF port system 22 via the sensor system 114 disposed on the funnel extension 28 and/or on the QF port 22.

The controller 100 may, for example, be disposed in the cab 17 and be communicatively coupled to a display 122 and input devices 124 (e.g., touchscreen, mouse, joystick, and so on). The controller 100 may additionally include one or more processors 126 and a memory system 128 that may execute software programs to perform the disclosed techniques. Moreover, the processors 126 may include multiple microprocessors, one or more "general-purpose" microprocessors, one or more special-purpose microprocessors, and/or one or more application specific integrated circuits (ASICS), or some combination thereof. For example, the processors 126 may include one or more reduced instruction set (RISC) processors. The memory system 128 may store information such as control software, configuration data, etc. The memory system 128 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

The controller 100 may automate certain operations. For example, the controller 100 may be used to detect as the funnel extension 28 approaches the bulk fill product tank 16 and, at a certain proximity to the QF port 22, open the lids 42 and/or 70.

The operator 120 may then proceed to filling the bulk fill product tank 16 with product delivered via the funnel extension 28. During filling operations, the sensors 114 disposed on the QF port system 22 and/or the funnel extension 28 may be used to monitor product levels inside of the bulk fill product tank 16. In one embodiment, the controller 100 may automatically issue alerts/alarms when a desire product level is detected via the sensors 114, 116. In certain embodiments, the controller 100 may additionally communicate with the seed tender system 24 to, for example, stop the delivery of the product when the desired level is reached, such as an operator selectable threshold level, e.g., by weight.

Once the desired level of product is disposed in the bulk fill product tank 16 the funnel extension 28 may be removed from the bulk fill product tank 16 and the product may then be applied, for example, during planting operations. By enabling a more efficient and faster deposition of product into the bulk fill product tank 16, the techniques described herein may enable improved farming operations and productivity.

It is to be understood that all of the embodiments of the QF port system 22 shown in FIGS. 1-10 may be provided as part of a kit, for example, used to retrofit an agricultural implement having a product tank such as the bulk fill product tank 16. For example, the kit may include instructions detailing cutting the opening(s) (e.g., openings 40, 72) into the bulk fill product tank, inserting the sidewall(s) 62, adhering the sidewall(s) 62 via adhesives and/or other fasteners (e.g., screws), and so on. Accordingly, a manual 130 may include the instructions to retrofit the QF port system 22 kit. After retrofitting, ground level filling of the product may be possible.

Figure 11:
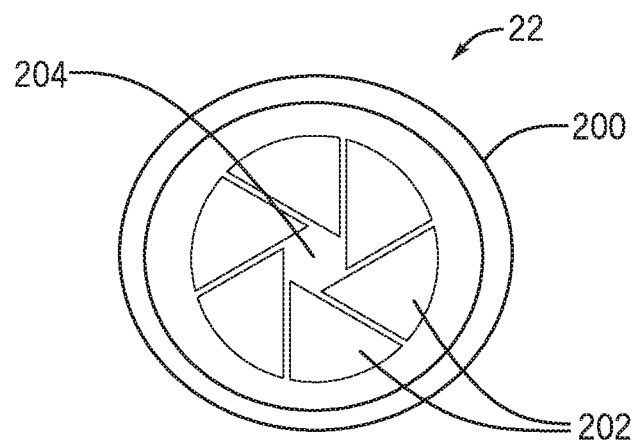
FIG. 11 is a top view of an diaphragm embodiment of the QF port system that may include a diaphragm to open and close entry into and out of the QF port system.

FIG. 11 depicts an embodiment of a QF port system 22 having a diaphragm valve (e.g., cover member) 200. The diaphragm or "iris" valve 200 may include multiple blades 202 suitable for partially or fulling closing an opening 204. As described above, the valve 200 may be communicatively/operatively coupled to the control system 90 and powered via hydraulic, electric, and/or pneumatic power to close and open (including partially close and open).

Figure 12:
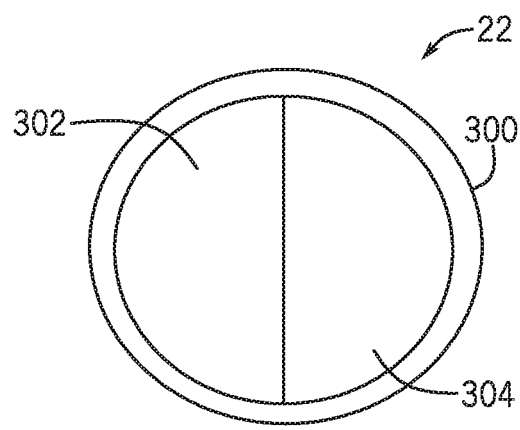
FIG. 12 is a top view of a dual door embodiment of the QF port system that may include two doors to open and close entry into and out of the QF port system.

FIG. 12 depicts an embodiment of the QF port system 22 having a "dual doors" valve 300 with doors (e.g., cover members) 302, 304. The dual doors 302, 304 may either slide open or flip open to enable delivery and/or inspection of product. Also as described above, the valve 300 may be communicatively/operatively coupled to the control system 90 and powered via hydraulic, electric, and/or pneumatic power to close and open (including partially close and open).

Figure 13:
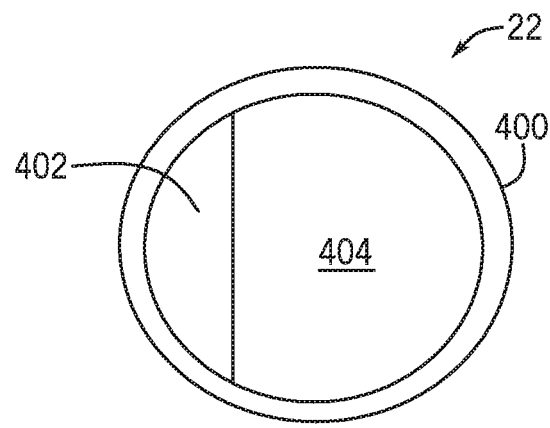
FIG. 13 is a top view of a single door embodiment of the QF port system that may include two doors to open and close entry into and out of the QF port system.

FIG. 13 depicts an embodiment of the QF port system 22 having a "sliding door" valve 400 with a door 402. In use, the door (e.g., cover member) 402 may slide to partially or completely cover opening 404 (shown partially covered). Also as described above, the valve 400 may be communicatively/operatively coupled to the control system 90 and powered via hydraulic, electric, and/or pneumatic power to close and open (including partially close and open).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
    a product tank configured to carry a product during farming operations comprising:
        a quick fill port system comprising:
            a first wall defining a first opening leading to an inside of the product tank; and
            a first cover member disposed inside the product tank to cover the first opening and configured to at least partially cover and to uncover the first opening;
        wherein the first opening comprises a first size larger than a diameter of a product dispenser configured to be inserted into the first opening.

2. The agricultural implement system of claim 1, wherein the first cover member comprises a first lid disposed on the first opening and configured to cover and to uncover the first opening; and a hinge mechanically coupled to the first lid and configured to enable the first lid to pivot about the hinge to cover and to uncover the first opening, wherein the opening comprises a first size larger than a diameter of a product dispenser configured to be inserted into the first opening.

3. The agricultural implement system of claim 2, wherein the quick fill port system comprises a powered mechanism mechanically coupled to the hinge and configured to open or close the hinge via the application of electric power, hydraulic power, pneumatic power, or a combination thereof.

4. The agricultural implement system of claim 1, wherein the first cover member comprises a sliding member that slidaby moves to reduce the size of the first opening or to close the first opening, a door member that opens or closes via a hinge, a first double door member configured to open and close a portion of the first opening, or a diaphragm member that moves to partially or completely cover the first opening.

5. The agricultural implement system of claim 1, wherein the quick fill port system comprises a first sensor system, wherein the first sensor system is configured to wirelessly communicate a product level measurement to a mobile device, to a controller, or to a combination thereof.

6. The agricultural implement system of claim 5, wherein the first sensor system is disposed on the first lid, on the product tank, under the product tank, or on a product tank support structure.

7. The agricultural implement system of claim 5, wherein the quick fill port system comprises a second sensor system, wherein the second sensor system is configured to detect a proximity, a presence, or a combination thereof, of the product dispenser.

8. The agricultural implement system of claim 7, wherein the second sensor system is communicatively coupled to a controller, and wherein the controller is configured to actuate an actuator to open the first cover member when the product dispenser is detected.

9. The agricultural implement system of claim 1, wherein the first cover member is operatively coupled to a switch or to a lever to close or to open the first opening.

10. The agricultural implement system of claim 1, wherein the agricultural implement comprises a planter having the product tank and the product tank comprises a bulk fill product tank configured to carry seed during agricultural operations, and wherein the product dispenser comprises a funnel extension of a seed tender system.

11. A bulk fill product tank system, comprising:
a quick fill port system comprising:
aa first wall defining a first opening leading to an inside of the product tank; and
a first cover member disposed inside the product tank to cover the first opening and configured to at least partially cover and to uncover the first opening; wherein the opening comprises a first size larger than a diameter of a product dispenser configured to be inserted into the first opening.

12. The bulk fill product tank system of claim 11, wherein the quick fill port system comprises a powered mechanism mechanically coupled to the first cover member and configured to open or close the first cover member via the application of electric power, hydraulic power, pneumatic power, or a combination thereof, and wherein the powered mechanism is configured to operatively couple to a mobile device, to a controller, or to a combination thereof, to open or close the first cover member.

13. The bulk fill product tank system of claim 11, wherein the quick fill port system comprises a first sensor system, wherein the first sensor system is configured to wirelessly communicate a product level measurement to a mobile device, to a controller, or to a combination thereof.

14. The bulk fill product tank system of claim 13, wherein the quick fill port system comprises a second sensor system, wherein the second sensor system is configured to detect a proximity, a presence, or a combination thereof, of the product dispenser.

15. The bulk fill product tank system of claim 11, wherein the quick fill port system is communicatively coupled to a controller to open or close the first cover member, to a switch to open or close the first cover member, or to a combination thereof.

* * * * *